United States Patent

[11] 3,604,058

| [72] | Inventor | Alfred Fischbach<br>Runderoth Cologne, AM Scheffoert, Germany |
|---|---|---|
| [21] | Appl. No. | 782,838 |
| [22] | Filed | Dec. 11, 1968 |
| [45] | Patented | Sept. 14, 1971 |
| [32] | Priority | Dec. 22, 1967 |
| [33] | | Germany |
| [31] | | P 17 29 160.0 |

[54] INJECTION MOLDING APPARATUS
24 Claims, 9 Drawing Figs.

[52] U.S. Cl. .................................................. 18/30 LA,
  18/30 LV
[51] Int. Cl. ...................................................... A43d 43/00
[50] Field of Search .......................................... 18/30 LA,
  30 LV

[56]  References Cited
  UNITED STATES PATENTS

| 3,346,925 | 10/1967 | Maier ........................... | 18/30 LA |
| 3,191,235 | 6/1965 | Rougement ................... | 18/30 LV |
| 3,497,919 | 3/1970 | Brochetti ....................... | 18/30 LV |

FOREIGN PATENTS

| 1,404,585 | 3/1965 | France .......................... | 18/30 LV |
| 1,504,178 | 10/1967 | France .......................... | 18/30 LA |

*Primary Examiner*—Charles W. Lanham
*Assistant Examiner*—R. M. Rogers
*Attorney*—Michael S. Striker ABSTRACT: An injection molding apparatus wherein the platen which carries the movable mold section receives locking and sealing pressures by way of a spindle which meshes with a spindle nut. The latter is free to rotate during movement of the platen between open and closed positions but is held against rotation during application of locking and sealing pressures furnished by a piston which is reciprocable in a cylinder of the platen or in a cylinder provided in a stationary support. The spindle is rigid with the platen when the piston is mounted in the support or the spindle is rigid with the piston when the latter is mounted in the platen. The spindle nut rotates in response to rotation of the spindle if the threads of the spindle and spindle nut are not of the self-locking type. If such threads are of the self-locking type, the spindle nut is rotated in response to displacement of the platen or by a separate prime mover.

INVENTOR:
Alfred FISCHBACH

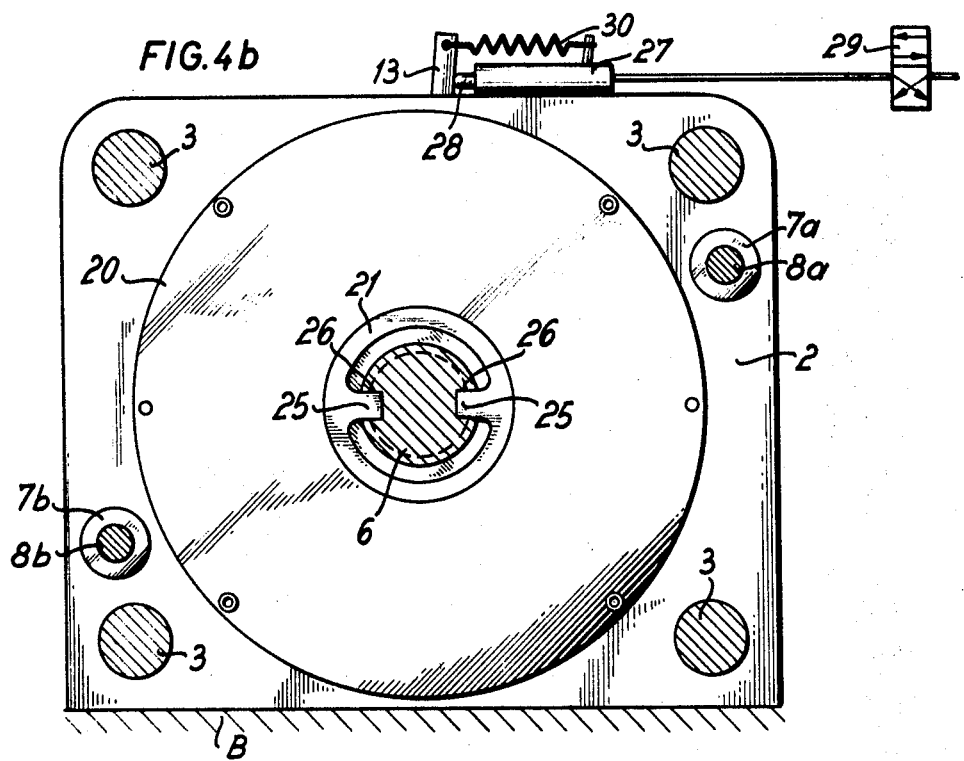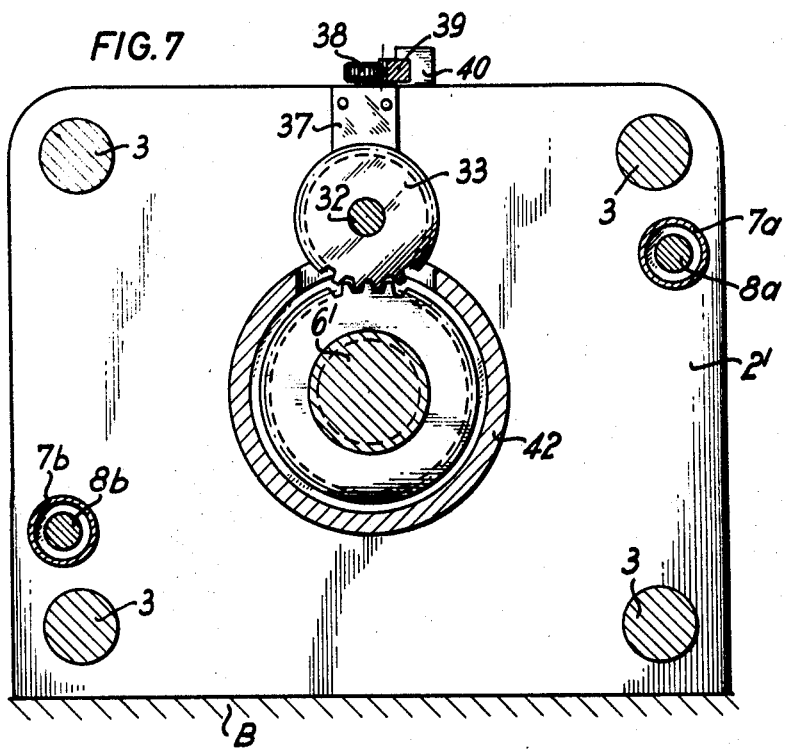

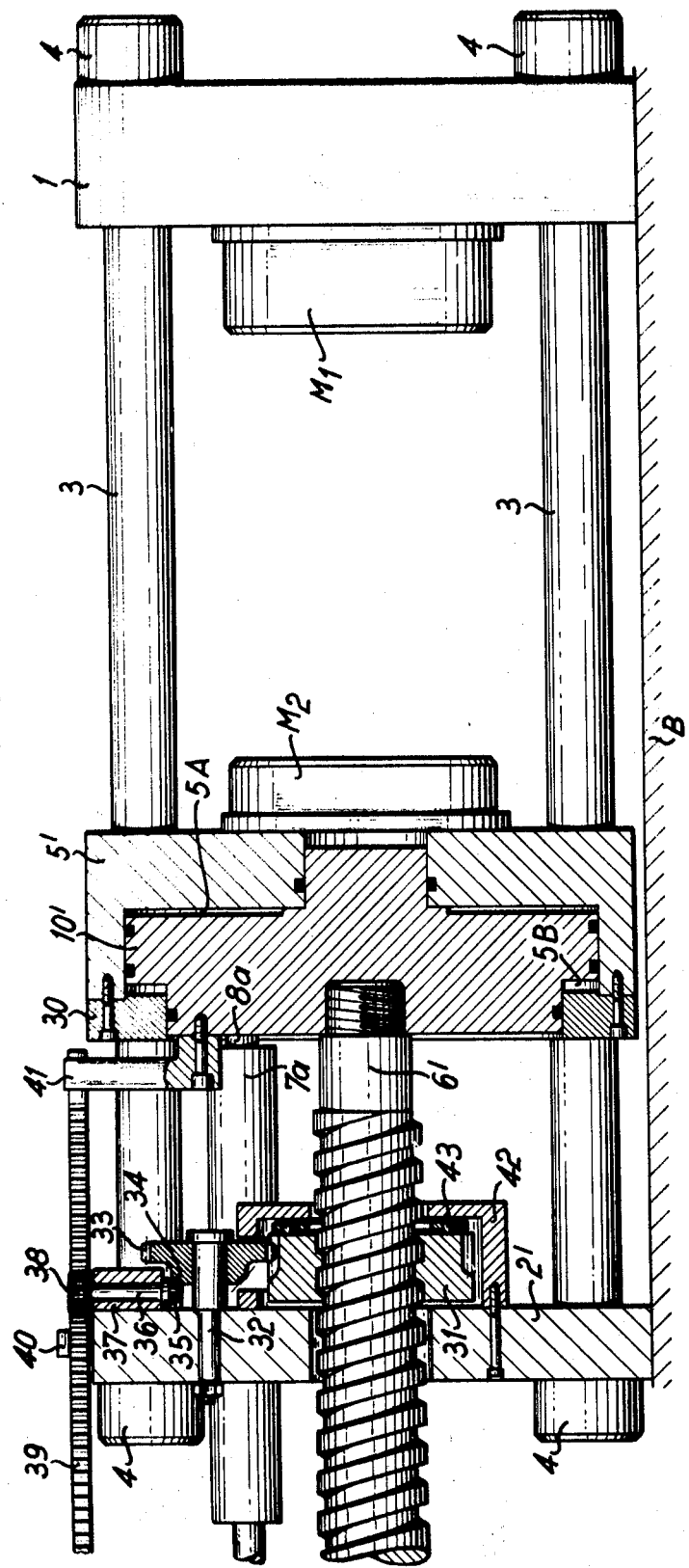

INVENTOR:
Alfred FISCHBACH his ATTORNEY 3,604,058

INJECTION MOLDING APPARATUS

BACKGROUND OF THE INVENTION

The present invention relates to injection molding apparatus, and more particularly to improvements in mechanisms for applying locking and sealing pressures to sections of the open-and-shut mold in an injection molding apparatus, especially an apparatus for the production of shaped articles from synthetic plastic material.

In many types of injection molding apparatus, a stationary platen or support carries a first mold section and a reciprocable platen carries a second mold section. Prior to injection of plasticized material into the cavity which is defined by the mold sections in closed position of the mold, the movable platen must be locked against movement away from the stationary support in order to prevent flashing of plasticized material. The forces required to apply requisite locking and sealing pressure are substantial and the distance which the movable platen covers in response to application of such substantial forces is a very small fraction of the distance covered by the movable platen from open toward closed but unlocked position.

Heretofore known injection molding apparatus often employ bayonet locks or analogous mechanical means for the application of locking and sealing forces. Such bayonet locks are normally interposed between a turnable locking plate and the cylinders which shift the movable platen between open and closed positions. It is also known to employ levers, cams, wedges or similar locking devices which are normally actuated by hydraulic means.

The just outlined conventional locking and sealing devices exhibit several serious drawbacks. As a rule they produce unbalanced stresses which tend to deform the tie rods along which the movable platen slides with reference to the fixed platen and which often lead to serious damage to or destruction of certain parts. Secondly, it is difficult to properly correlate the operation of the mold closing and opening means with the operation of locking and sealing devices. As a rule, the injection molding apparatus must be provided with a complicated auxiliary equipment which allows for requisite adjustments in operation of the locking device and contributes significantly to initial and maintenance cost of the apparatus.

It is also known to provide the movable platen with a spindle which meshes with a driven spindle nut. In such apparatus, the spindle merely serves as a means for transmitting motion to the movable platen.

SUMMARY OF THE INVENTION

An object of the present invention is to provide an injection molding apparatus with a simple, compact, rugged and reliable locking and sealing mechanism which can stand substantial stresses, which invariably insures proper locking and sealing of the mold during admission of plasticized material and during subsequent cooling of articles, and which comprises a relatively small number of parts.

Another object of the invention is to provide a locking mechanism of the just outlined character which can perform additional important and useful functions, particularly that of partially opening the mold subsequent to cooling of the article or articles therein.

A further object of the invention is to provide a locking and sealing mechanism which can be built into presently known injection molding apparatus with relatively minor alterations in the design of such apparatus.

An additional object of the invention is to provide a locking and sealing mechanism which occupies little room in an injection molding apparatus and which permits movement of the movable platen to any one of a large number of open positions.

Still another object of the invention is to provide a locking and sealing mechanism which can be used with equal advantage in relatively small as well as in large injection molding apparatus.

A further object of the invention is to provide an injection molding apparatus wherein the mold sections can be exchanged without affecting the operation of the locking and sealing mechanism.

The invention is embodied in an injection molding apparatus which comprises a stationary support, a mold including a pair of mold sections, a platen which is connected with one of the mold sections and is movable by a fluid-operated cylinder and piston arrangement toward and away from the support between open and closed positions in which the mold sections are respectively spaced from and close to each other, and a novel mechanism for applying locking and sealing pressures to the mold in the closed position of the platen. The locking and sealing mechanism comprises a spindle member which is operatively connected with the platen to share its movements between open and closed positions, a spindle nut member meshing with the spindle member, one of these members being rotatable with reference to the other member during movement of the platen between open and closed positions, locking means preferably comprising a piston reciprocably mounted in the stationary support or in the platen and operative to move the platen beyond closed position, and blocking means for holding the one member against rotation during operation of the locking means whereby the platen transmits locking and sealing pressures to the mold sections.

If the mating threads of the spindle nut member and spindle member are not of the self-locking type, the one member is free to rotate in response to axial movement of the spindle member. The blocking means then comprises a device which can nonrotatably couple the one member to the stationary support.

If the mating threads of the spindle nut member and spindle member are of the self-locking type, the one member is rotated in response to movement of the platen or by a separate prime mover while the platen moves between open and closed positions. The blocking means then simply comprises means for holding the drive for the one member against transmission or torque to the one member while the locking member is in operation. The spindle member can be rigidly affixed to the platen when the locking means is mounted in the support; when the locking means is mounted in the platen, it is connected to the spindle member.

The novel features which are considered as characteristic of the invention are set forth in particular in the appended claims. The improved injection molding apparatus itself, however, both as to its construction and its mode of operation, together with additional features and advantages thereof, will be best understood upon perusal of the following description of certain specific embodiments with reference to the accompanying drawing.

BRIEF DESCRIPTION OF THE DRAWING

FIG. 4b is a transverse vertical section similar to that shown in FIG. 4a and showing a slight modification;

FIG. 5 is a partly elevational and partly longitudinal vertical sectional view of a second injection molding apparatus, with the mold shown in open position;

FIG. 7 is a transverse vertical sectional view as seen in the direction of arrows from the line VII—VII of FIG. 6.

DESCRIPTION OF THE PREFERRED EMBODIMENTS

Figure 1:
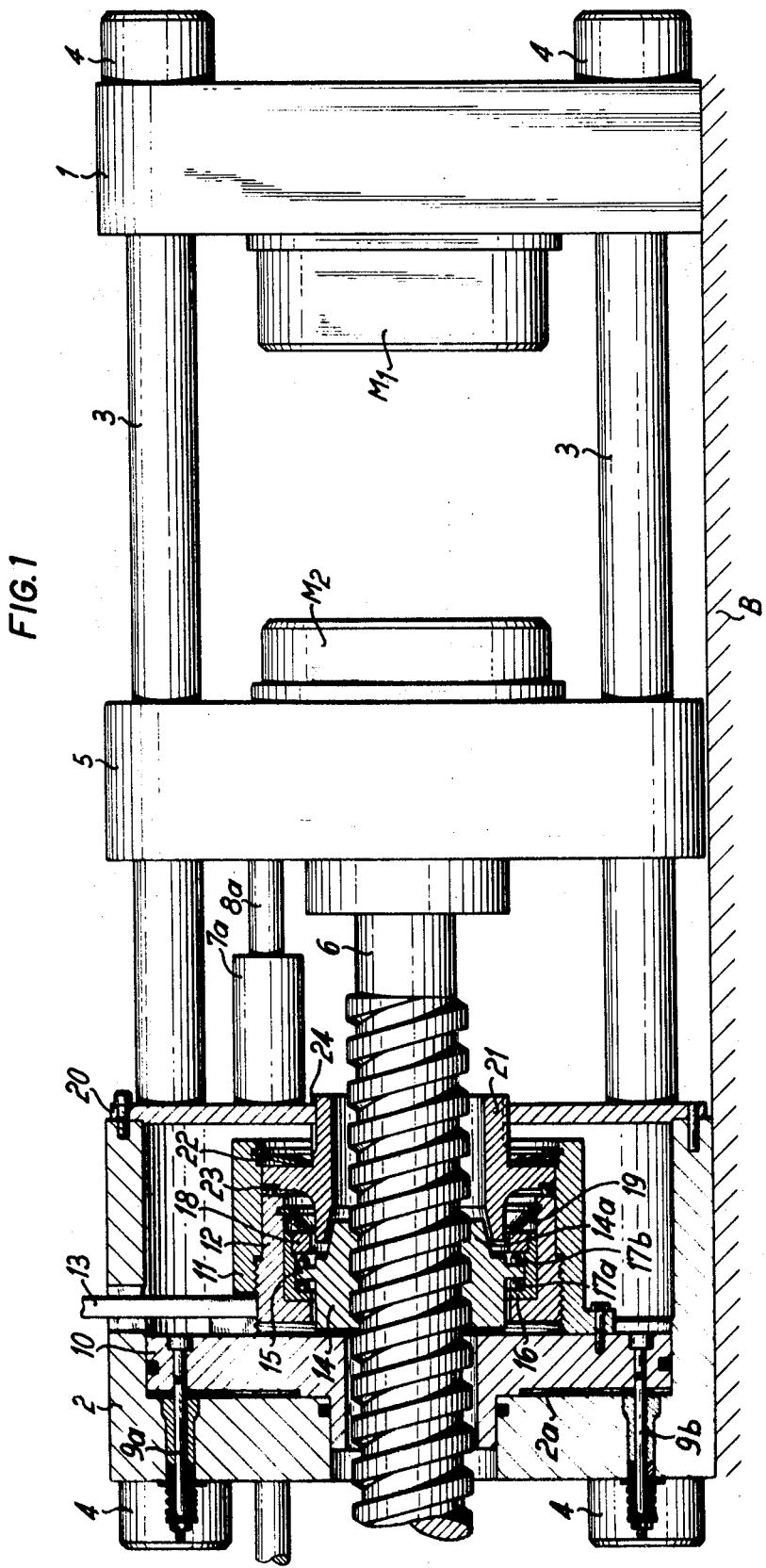
FIG. 1 is a partly elevational and partly central vertical sectional view of an injection molding apparatus which embodies one form of the invention, the mold of the apparatus being shown in open position.

The injection molding apparatus of FIGS. 1 to 4 comprises a first stationary support 1 and a second stationary support 2, both mounted on a base plate B and affixed to the ends of four parallel horizontal tie rods 3 which are provided with nuts 4. The tie rods 3 carry a reciprocable carrier or platen 5 which is rigidly connected with one end of a centrally located elongated spindle 6. The means for reciprocating the platen 5 along the tie rods 3 between the open and closed positions of FIGS. 1 and 2 comprises two hydraulically operated cylinders 7a, 7b which are mounted in the support 2. The piston rods 8a, 8b of these cylinders are coupled to the platen 5. A portion of the support 2 constitutes a large-diameter cylinder which accommodates a short locking piston 10; the latter is shown in its inoperative left-hand end position by spring-biased bolts 9a, 9b. An internally threaded slotted outer sleeve 11 is affixed to the piston 10 by bolts or analogous fasteners. The outer sleeve 11 meshes with an inner sleeve 12 having a radially outwardly and upwardly extending arm 13 which passes through the slot of the outer sleeve. The external threads of the aforementioned spindle 6 mesh with the internal threads of a spindle nut 14 which is provided with an external annular flange 15. The latter extends between two annuli of antifriction bearings 17a, 17b installed in a flanged cage or muff 16. The mating threads of the spindle 6 and spindle nut 14 are not of the self-locking type. The muff 16 is accommodated in the inner sleeve 12 which latter serves as a retainer for a dished spring 19 serving to bias a distancing ring 18. The right-hand axial end of the support 2 (as viewed in FIG. 1 or 2) is provided with a fixedly secured cover plate 20 which accommodates a coaxial blocking element here shown as a cone 21. The latter is non-rotatably but axially movably mounted in the cover plate 20 (as at 24) and preferably also in the outer sleeve 11 and is biased by a dished spring 22 in a direction to the left to bear against an annular thrust bearing 23 installed adjacent to the right-hand end face of the inner sleeve 12. The cone 21 can be provided as a substitute for the toothed profile 24 with a tongue and groove connection 25, 26 which is established between the spindle 6 and cone 21 as shown in FIG. 4b.

Figure 3:
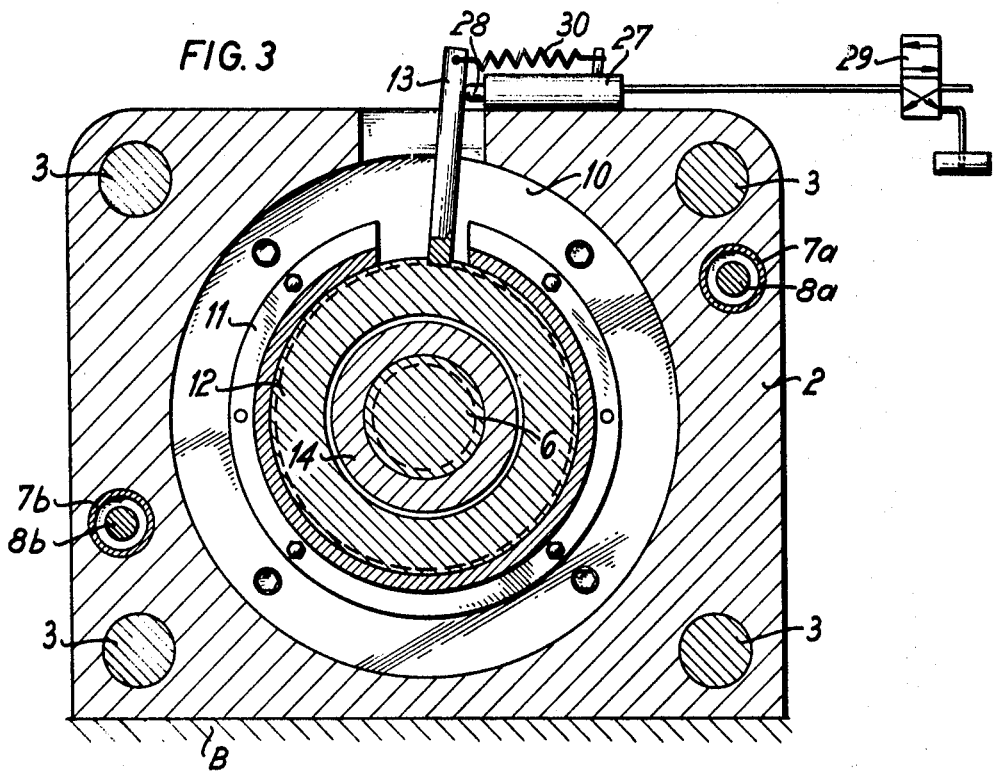
FIG. 3 is a transverse vertical sectional view as seen in the direction of arrows from the line III—III of FIG. 2.
Figure 4A:
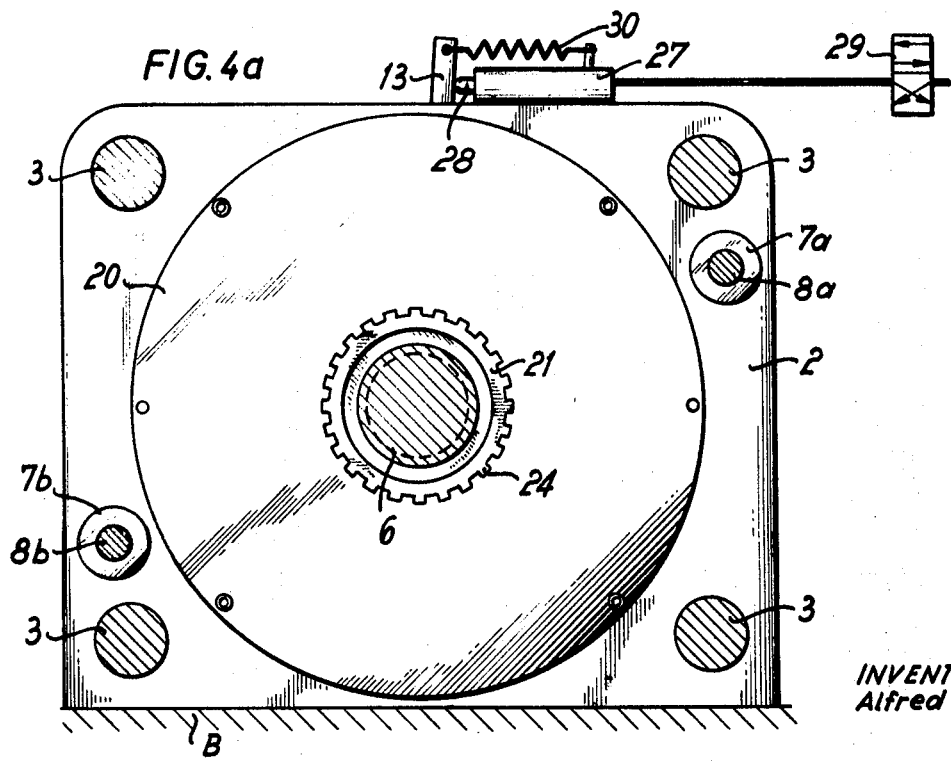
FIG. 4a is a transverse vertical sectional view as seen in the direction of arrows from the line IV—IV of FIG. 2.

The top face of the support 2 carries a relatively small fluid-operated cylinder 27 having a piston rod 28 which can pivot the arm 13 in a counterclockwise direction, as viewed in FIG. 3 or 4a and 4b. The arm 13 is coupled to the cylinder 27 by a helical spring 30 so that it always bears against the piston rod 28. A valve 29 regulates the admission and evacuation of oil from the cylinder 27.

Figure 2:
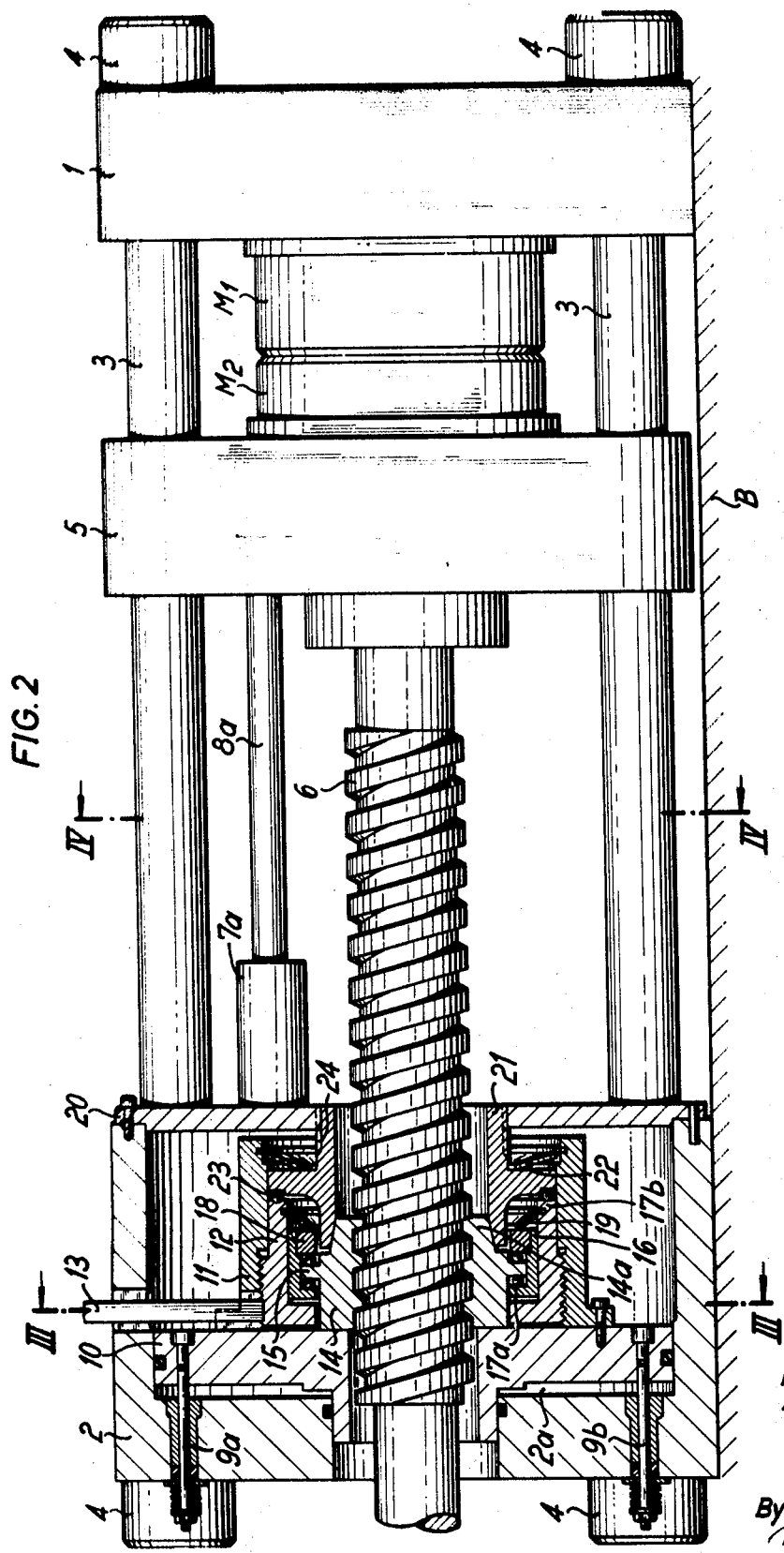
FIG. 2 is a similar partly elevational and partly sectional view but showing the mold in closed position.

The characters M1, M2 denote two mold sections which are respectively secured to the support 1 and platen 5 and which define a mold cavity when the platen is moved to and locked in the closed position shown in FIG. 2. The mechanism which injects plasticized material into the mold cavity by way of the support 1 is of conventional design and is not shown in the drawing.

In the apparatus of FIGS. 1 to 4a or 4b, the components 6, 10, 14 form part of the locking and sealing mechanism which applies to the mold sections M1, M2 a requisite locking and sealing pressure by way of the platen 5. The locking and sealing mechanism comprises a blocking device which prevents rotation of spindle nut 14 when the piston 10 is operate to move the platen beyond its closed position, and such blocking device includes the sleeve 12, the blocking element or cone 21, and the means 11, 13, 27–30 for moving the sleeve 12 and cone 21 axially so as to place the cone into strong frictional engagement with the spindle nut 14. The latter is then locked to the cover plate 20 of the support 2.

The operation:

In order to move the platen 5 from the open position of FIG. 1 to the closed position of FIG. 2, the programming system of the apparatus admits oil or other suitable pressure medium into the left-hand chambers of the cylinders 7a, 7b whereby the piston rods 8a, 8b shift the platen along the tie rods 3 and move the mold section M2 very close to or into abutment with the mold section M1. The platen 5 entrains the spindle 6 and since the mating threads of spindle 6 and spindle nut 14 are not of the self-locking type, the spindle turns the spindle nut which latter is held against axial movement by the bearings 17a, 17b and cage or muff 16. As stated before, the spindle nut 14 has a flange 15 which is received between the bearings 17a, 17b. The spring 18 which bears against the distancing ring 18 is installed under initial stress so that it can take up axial stresses which develop when the nut 14 turns in response to axial movement of the spindle 6 while the piston rods 8a, 8b move the platen 5 toward the closed position of FIG. 2. At the same time, the valve 29 admits a pressure medium into the cylinder 27 so that the arm 13 is held in its left-hand end position, i.e., not in the end position shown in FIG 3. Shortly before the platen 5 reaches the closed position of FIG. 2, a movable part of the injection molding apparatus actuates the valve 29 so that the latter permits escape of pressure medium from the cylinder 27, i.e., the spring 30 is free to contract and to move the arm 13 to the end position shown in FIG. 3. Such angular displacement of the arm 13 causes a corresponding axial displacement of the inner sleeve 12 in a direction toward the piston 10 (compare FIGS. 1 and 2) because the sleeve 12 is in mesh with the outer sleeve 11 which is affixed to the piston 10. The spindle nut 14 is thereby moved into abutment with the piston 10. At the same time, the spring 22 shifts the cone 21 onto the complementary cone of 14a of the spindle nut 14 so that the latter is held against rotation by friction between the cones 14a and 21. In the next step, the cylinder chamber 2a of the support 2 receives pressure medium to move the piston 10 in a direction to the right whereby the piston shifts the spindle nut 14, spindle 6 and platen 5 in the same direction to apply a requisite locking and sealing pressure which prevents flashing during injection of plasticized material into the cavity defined by the mold sections M1 and M2. Torque which is thereby generated and acts on the spindle nut 14 is transmitted to the support 2 by way of the cone 21 and the latter's toothed profile 24 which prevent rotation of the cone with reference to the cover 20 of the support 2. If the profile 24 is omitted, torque is transmitted to the spindle 6 by way of the tongue and groove connection 25,26.

It is clear that the improved injection molding apparatus may be provided with a locking and sealing mechanism which comprises two or more preferably symmetrically distributed spindles and an equal number of spindle nuts. Regardless of the number of spindles, each spindle nut is free to rotate while the platen 5 moves toward closed position and each spindle nut is held against rotation during the application of locking and sealing pressures by way of the piston 10. Once the platen 5 reaches the closed position, the spindle nut or spindle nuts bear against a stationary part (i.e., against the support 2 by way of the piston 10) which serves as a back support and takes up stresses which develop during the application of locking and sealing pressures.

An important advantage of the improved injection molding apparatus is that its parts, particularly the tie rods 3, are subjected to balanced stresses so that the likelihood of uncontrollable deformation or breakage is much less pronounced than in aforedescribed conventional apparatus. Furthermore, the application of sealing and locking forces can be carried out independently of the combined width of the mold sections M1, M2 (as seen in the axial direction of the tie rods 3). Thus, the mold sections M2, M2 can be replaced by shorter or longer mold sections without affecting the operation of the improved locking and sealing mechanism. All that is necessary is to change the position of actuating means for the valve 29 to insure that the arm 13 is pivoted by spring 30 when the platen 5 approaches or reaches its closed position.

Figure 6:
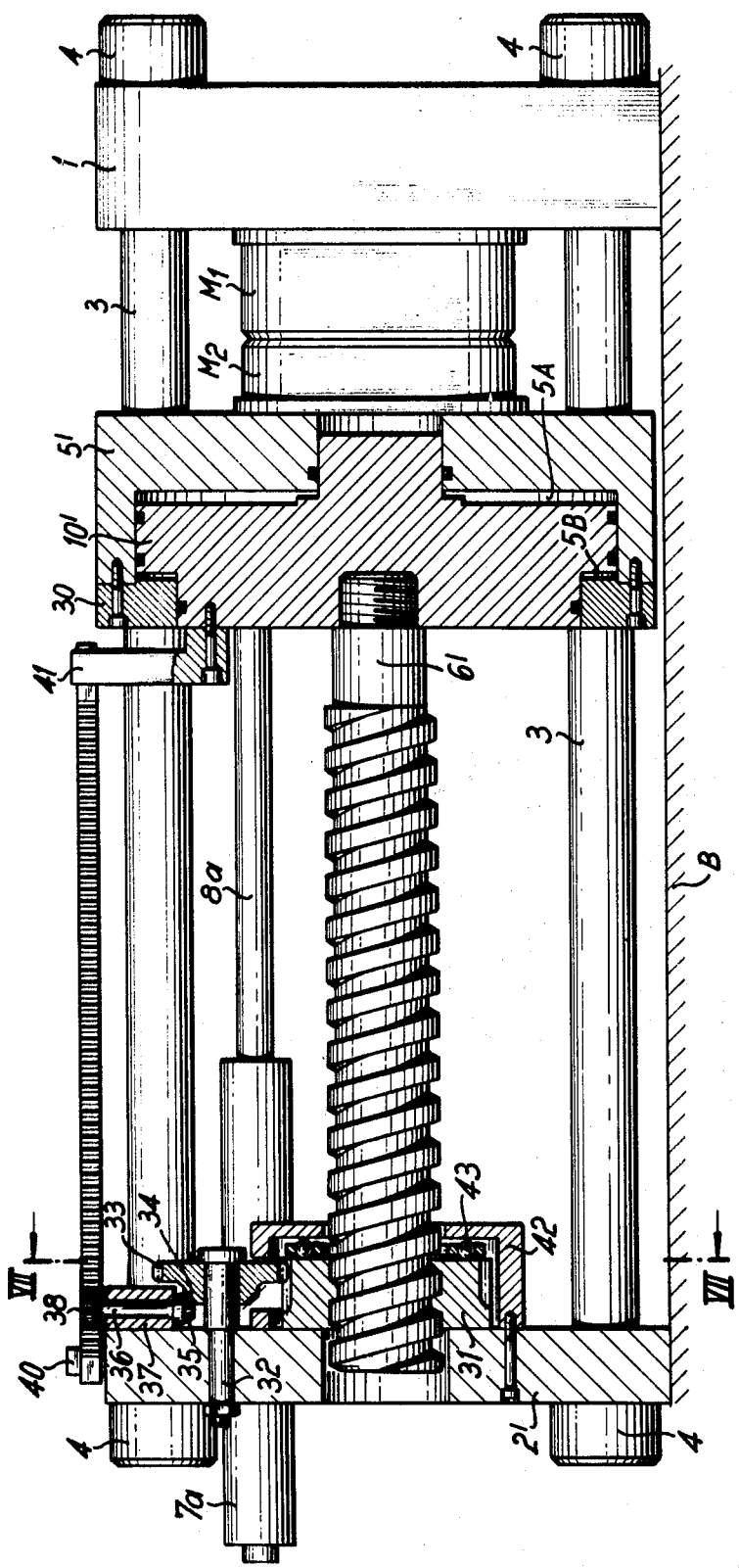
FIG. 6 is a similar partly elevational and partly sectional view of the second apparatus but showing the mold in closed position.

In the injection molding apparatus which is shown in FIGS. 5 to 7, the reciprocable platen 5' constitutes or comprises a double-acting cylinder for a locking piston 10' which is rigid with a single centrally located spindle 6'. The platen 5' comprises a detachable ring-shaped portion 30 and defines two cylinder chambers 5A, 5B the former of which receives a pressure medium when the mold including the sections M1, M2 is to be locked and sealed in closed position of the platen 5'. The chamber 5B receives pressure medium to unlock the mold. The external threads of the spindle 6' mesh with internal threads of a spindle nut 31 and the mating threads are of the self-locking type. The spindle nut 31 is formed with external teeth which mesh with the teeth of a spur gear 33 mounted on a shaft 32 which is installed in the stationary support 2'. The gear 33 is integral or rigidly connected with a bevel gear 34 in mesh with a second bevel gear 35 which is mounted on a shaft 36 journaled in a bearing 37 carried by the support 2'. The upper end of the shaft 36 carries a pinion 38 which meshes with a toothed rack 39. The latter is guided in ways 40 and has an arm 41 which is attached to the piston 10'. The support 2' is provided with a rigidly mounted retainer or cage 42 for a thrust bearing 43 adjacent to that axial end of the spindle nut 31 which faces the piston 10'.

The apparatus of FIGS. 5 to 7 is operated as follows:

The left-hand chambers of the cylinders 7a and 7b receive a pressure medium so that the corresponding piston rods 8a and 8b move the platen 5' with the mold section M2 to the closed position shown in FIG. 6. Such admission of pressure medium into the cylinders 7a, 7b may but need not result in movement of the platen 5' all the way to the closed position. The piston 10' moves with the platen 5' and entrains the rack 39 by way of the arm 41 so that the pinion 38 rotates the shaft 36, bevel gears 35, 34 and the spur gear 33. The latter rotates the spindle nut 31. The ration of the just described gear transmission is selected in such a way that the distance between the spindle nut 31 and the stationary support 2' remains unchanged. When the platen 5' approaches or reaches the closed position, the chamber 5A receives a pressure medium and the chamber 5B permits escape of the pressure medium therefrom. Therefore, the locking piston 10' first moves in a direction to the left until the spindle nut 31 comes into abutment with the support 2'. During the next stage of fluid admission into the chamber 5A, the platen 5' is displaced in a direction to the right and applies a requisite sealing and locking pressure to the mold sections M1 and M2. Upon completion of the injection molding step and after elapse of a requisite interval which is needed for cooling of the freshly formed injection molded article, the system of valves which control the flow of pressure medium allows such medium to escape from the chamber 5A and admits pressure medium to the chamber 5B. The piston 10' is moved axially to the right until the spindle nut 31 returns into abutment with the thrust bearing 43. As the chamber 5B continues to receive pressure medium, the mold section M2 is moved slightly away from the mold section M1 to insure that the molded article is disengaged from one of these sections. The cylinders 7a, 7b and their pistons 8a, 8b then complete return movement of the platen 5' to the open position of FIG. 5. The admission of pressure medium is terminated when the platen 5' is located at a desired distance from the stationary support 1. While the piston rods 8a, 8b move the platen 5' away from the support 1, and the rack 39 causes the gear 33 to rotate and this gear rotates the spindle nut 31 so that the spindle 6' can move axially to the position shown in FIG. 5 despite the fact that the threads on the parts 6', 31 are of the self-locking type.

An important advantage of the just-described apparatus is that the application of locking and sealing forces can begin in automatic response to termination of rotation of the spindle nut 31. Another important advantage of this apparatus is that the means for rotating the spindle nut 31 derives from the movable platen 5' so that it is not necessary to employ a separate prime mover for the spindle nut. Moreover, such operative connection between the means for rotating the spindle nut 31 and the platen 5' insures that rotary movements of spindle nut are invariably synchronized with movements of the platen along the tie rods 3.

In FIG. 5, the right-hand end face of the support 2' constitutes a stop against which the spindle nut 31 bears when it is held against rotation while the piston 10' is operated to apply a requisite locking and sealing force. The thrust bearing 43 constitutes a second stop for the spindle nut 31; the latter abuts against this second stop when it is caused to rotate by the drive 33–41.

Figure 8:
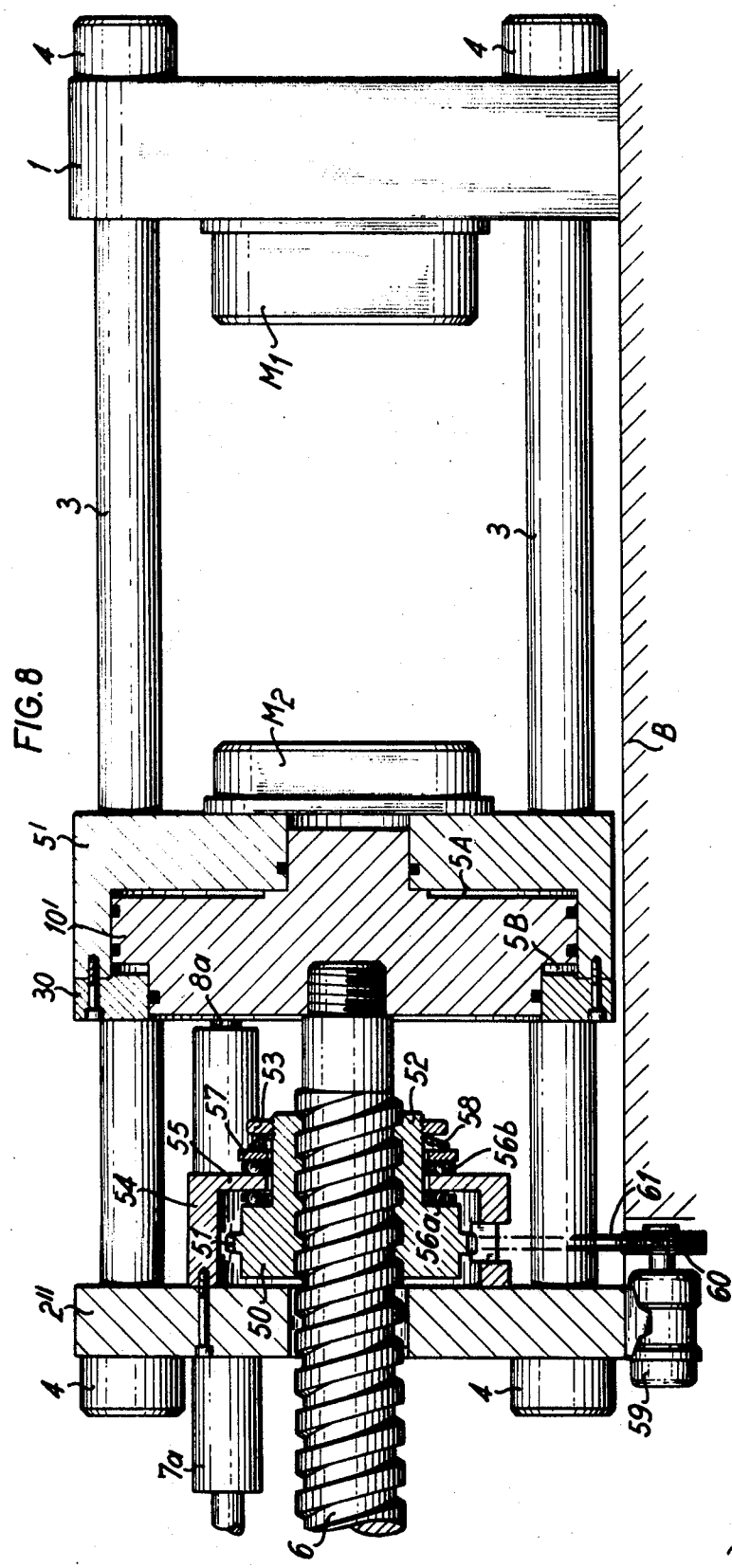
FIG. 8 is a partly elevational and partly longitudinal vertical sectional view of a third injection molding apparatus which constitutes a modification of the apparatus shown in FIGS. 5–7.

FIG. 8 shows a third injection molding apparatus wherein the reciprocable platen 5' is identical with the platen shown in FIGS. 5 to 7. This platen accommodates a reciprocable locking piston 10' which is rigidly connected with the spindle 6'. The latter meshes with a spindle nut 50 which has a gear or sprocket wheel 51 and an externally threaded end portion 52 which meshes with an internally threaded retaining ring 53. The stationary support 2'' carries or is integral with a rigidly mounted retainer or cage 54 which is formed with an inwardly extending collar 55 located between two thrust bearings 56a, 56b. The right-hand thrust bearing 56b is located between the collar 55 and a ring 57 which is biased thereagainst by a dished spring 58 reacting against the ring 53. The support 2'' carries the housing of a reversible electric motor 59 whose output shaft is rigid with a sprocket wheel 60. A chain 61 which is trained over the sprocket wheels 51, 60 can rotate the spindle nut 50.

The operation:

The programming system of the injection molding apparatus preferably comprises solenoid-operated valves which regulate the admission and evacuation of oil or other pressure medium into and from the various cylinder chambers. Such valves are energized to admit oil into the cylinders 7a 7b (the latter not shown in FIG. 8) so that the piston rods (only 8a shown) move the platen 5' toward the stationary support 1. The motor 59 is started simultaneously with admission of oil into the cylinders 7a, 7b to rotate the spindle nut 50 by way of the chain transmission 60, 61, 51. The motor 59 is of the rotating field type, i.e., it comes to a halt when it meets a predetermined resistance to rotation and remains idle while such resistance exists; however, it begins to run as soon as the resistance decreases. In this way, the motor 59 can turn the spindle nut 50 at such a rate that the latter does not interfere with axil movement of the piston 10' and spindly 6' in response to movement of the platen 5' toward closed position. The motor 59 insures that the spindle nut 50 bears against the thrust bearing 56a regardless of the axial speed of the spindle 6'. When the mold including the sections M1, M2 is closed, the admission of oil to the cylinders 7a, 7b is terminated and the motor 59 is disconnected from the energy source. In the next step, the cylinder chamber 5A of the platen 5' receives oil so that the piston 10' moves the spindle 6' in a direction to the left until the spindle nut 50 reaches and abuts against the support 2''. As the chamber 5A continues to receive oil, the platen 5' applies to the mold sections M1, M2 a requisite sealing and locking pressure which is maintained during injection of plasticized material and during subsequent cooling of the resulting article.

The chamber 5A is thereupon allowed to discharge oil and the cylinder chamber 5B receives oil to effect rightward axial movement of the piston 10' and spindle 6' until the spindle nut 50 reaches the thrust bearing 56a. Further admission of oil into the chamber 5B then causes the platen 5' to move to the left, as viewed in FIG. 8, and to open the mold. The motor 59 is started when the spindle nut 50 returns into engagement with the thrust bearing 56a, and the admission of oil into the right-hand chambers of the cylinders 7a, 7b begins simultaneously with starting of the motor 59. Of course, the motor 59 then rotates in opposite direction so that the spindle nut 50 is rotated in a sense to remain in abutment with the thrust bearing 56a. The platen 5' is arrested in its open position (shown in FIG. 8) in which the mold section M2 is located at a desired distance from the mold section M1. Such termination of leftward movement of the platen 5' is brought about by closing of valves which admit oil to the right-hand chambers of the cylinders 7a, 7b.

It is clear that the motor 59 can be replaced by a polyphase induction motor; it is then necessary to install a friction clutch between the output shaft of the motor and the sprocket wheel 60 or between the spindle nut 50 and its sprocket wheel 51. The friction clutch is preferably of the adjustable type so that the torque transmitted thereby can be selected in advance.

An advantage of the apparatus shown in FIG. 8 is that the spindle nut 50 can be driven by a compact unit WHICH NEED NOT DERIVE MOTION FORM THE PLATEN %'. This is desirable in certain instances, for example, when there is no room to install gear transmission of FIGS. 5-7. Thus, the spindle nut 50, whose threads are of the self-locking type as in the apparatus of FIGS. 5-7, can be arrested in response to opening of the motor circuit at the exact moment when the operator wishes to apply locking and sealing forces. As stated in connection with FIGS. 14 and 57, each of the illustrated injection molding apparatus may be provided with two or more spindles and with an equal number of spindle nuts.

It is further clear that the injection molding apparatus of my invention may utilize a stationary spindle nut and a rotary spindle. The modifications necessary to bring about such simple reversal of functions will be obvious upon perusal of the preceding disclosure.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In an injection molding apparatus, a combination comprising a stationary support; a mold including a pair of mold sections; a platen connected with one of said sections and movable toward and away from said support between open and closed positions in which said sections are respectively spaced from and adjacent to each other; moving means connected to said platen for moving the same between said open and closed positions; and an additional mechanism for applying locking and sealing pressures to said mold in the closed position of said platen, including a spindle member operatively connected with said platen for movement therewith between said open and closed positions, a spindle nut member meshing with said spindle member, one of said members being rotatable with reference to the other member during movement of said platen between open and closed positions, locking means operative to move said platen beyond closed position, and blocking means for holding said one member against rotation during operation of said locking means whereby the platen transmits locking and sealing pressures to said mold sections.

2. A combination as defined in claim 1, wherein said locking means comprises a piston and said support comprises a cylinder which accommodates said platen for axial movement toward and away from the other mold section.

3. A combination as defined in claim 1, wherein said locking means comprises a piston and said platen comprises a cylinder which accommodates said piston for movement toward and away from said stationary support.

4. A combination as defined in claim 1, wherein said members are provided with mating threads and wherein said one member is said spindle nut member which is free to rotate in response to movement of said spindle member with said platen between open and closed positions, said blocking means comprising means for holding said spindle nut member against rotation on operation of said locking means.

5. A combination as defined in claim 4, wherein said blocking means comprises means for coupling said spindle nut member to said stationary support.

6. A combination as defined in claim 5, wherein said blocking means comprises a sleeve, means for turning said sleeve and for thereby moving said spindle nut member axially, and a blocking element arranged to engage with and to couple said spindle nut member to said support in response to turning of said sleeve.

7. A combination as defined in claim 6, wherein said sleeve is mounted on said locking means.

8. A combination as defined in claim 7, wherein said locking means comprises a piston and said stationary support comprises a cylinder reciprocably receiving said piston for movement toward and away from the other mold section.

9. A combination as defined in claim 6, wherein said blocking element is a cone which is nonrotatably but axially movably mounted in said support.

10. A combination as defined in claim 6, further comprising means for turnably supporting said sleeve.

11. A combination as defined in claim 10, wherein the means for turnably supporting said sleeve comprises a second sleeve having internal threads meshing with external threads provided on said first mentioned sleeve and wherein said turning means is arranged to turn said first mentioned sleeve with reference to said second sleeve whereby said first mentioned sleeve moves axially with said spindle nut member.

12. A combination as defined in claim 4, wherein said spindle member is rigidly affixed to a central portion of said platen and wherein said locking means comprises a hydraulically operated piston reciprocable in a cylinder provided therefor in said stationary support, said spindle member extending through said piston.

13. A combination as defined in claim 4, wherein said one member is said spindle nut member and wherein said blocking means comprises a cage, a pair of thrust bearings in said cage, a flange provided on said spindle nut member between said bearings, a sleeve rigid with said cage and movable axially to thereby displace said spindle nut member, and a blocking element arranged to engage with said spindle nut member in response to axial movement of said sleeve and to thereby hold said spindle nut member against rotation with reference to said support.

14. A combination as defined in claim 13, wherein said blocking means further comprises means for moving said sleeve axially, said last mentioned means comprising an internally threaded second sleeve meshing with said first mentioned sleeve, an arm affixed to said first mentioned sleeve, and a fluid-operated cylinder and piston assembly for rocking said arm to thereby rotate said first-mentioned sleeve in said second sleeve whereby said first-mentioned sleeve moves axially.

15. A combination as defined in claim 1, wherein said one member is said spindle nut member and wherein said members are provided with self-locking mating threads, said blocking means comprising a pair of stops provided on said support and drive means for rotating said spindle nut member during movement of said platen between open and closed positions whereby said spindle nut member abuts against one of said stops, said spindle nut member being arranged to bear against the other stop and to be thus held against rotation during operation of said locking means.

16. A combination as defined in claim 15, wherein said one stop comprises a thrust bearing.

17. A combination as defined in claim 15, wherein said drive means derives motion from said platen.

18. A combination as defined in claim 17, wherein said drive means comprises a first gear provided on said spindle nut member, a toothed rack coupled to said platen, and a least one additional gear interposed between said rack and said first mentioned gear to rotate the latter in response to movement of said platen.

19. A combination as defined in claim 15, wherein said drive means comprises a prime mover.

20. A combination as defined in claim 19, wherein said prime mover comprises a reversible motor which is arranged to change the direction of its rotation in response to a change in the direction of movement of said platen between open and closed positions.

21. A combination as defined in claim 20, wherein said drive means further comprises a transmission between said motor and said spindle nut member.

22. A combination as defined in claim 21, wherein said motor is of the rotary field type.

23. A combination as defined in claim 1, wherein said spindle member is rigid with said locking means and wherein said locking means comprises a piston reciprocable in a hydraulic cylinder provided therefor in one of the parts including said platen and said support.

24. A combination as defined in claim 1, wherein said moving means comprise fluid-operated cylinder and piston means.